Patented May 23, 1944

2,349,599

UNITED STATES PATENT OFFICE 2,349,599

PRODUCTION OF DIARYLENETHIAZYL DISULPHIDES

Robert W. Moorhouse, Sharon Township, Medina County, Ohio, assignor to Wingfoot Corporation, Akron, Ohio, a corporation of Delaware No Drawing. Application January 30, 1943, Serial No. 474,230

2 Claims. (Cl. 260—306.5)

This invention relates to an improved method of producing diarylenethiazyl disulphides, such as dibenzothiazyl disulphide, which is an accelerator of rubber vulcanization and is known in the trade as "Altax."

It has been proposed that dibenzothiazyl disulphide be produced by the chlorination of the sodium salt of 2-mercaptobenzothiazole, the process being described as applicable to the commercially pure grades of 2-mercaptobenzothiazole. If applied to crude 2-mercaptobenzothiazole, such as that resulting from the process known as the Kelly process and described in U. S. 1,631,871, a relatively impure product is obtained because the disulphide produced by this and similar processes contains tarry by-product which is, to a considerable extent, soluble in a caustic solution or is suspended in such a solution and carried over into the disulphide and precipitated therewith as an impurity. In fact, even when the sodium salt is prepared from commercially pure 2-mercaptobenzothiazole, a substantial proportion of the impurities present is taken up in the solution and carried into the dibenzothiazyl disulphide.

Following my process, 2-mercaptobenzothiazole, such as that produced by the Kelly process, is treated with lime to produce the calcium salt of 2-mercaptobenzothiazole. The aqueous solution of this calcium salt is separated from the insoluble impurities and is then treated with a halogen gas such as chlorine. This oxidizes the thiazole to the disulphide, which is insoluble in water and precipitates out. The disulphide is then filtered off and may be purified by washing.

Surprisingly, although the thiazole is readily soluble in the lime as well as in caustic, the impurities are far less soluble when lime is used. Thus, the solution of the calcium salt is substantially more free from impurities than the sodium salt solution and the disulphide produced as herein described is of higher purity than that obtained by solution with caustic and subsequent oxidation by a halogen gas.

The following example illustrates the invention. A slurry is produced from 125 pounds of commercial hydrated lime and 850 gallons of water. Five hundred pounds of crude 2-mercaptobenzothiazole prepared by the Kelly process and containing, for example, 8% of a tarry impurity is dissolved in the resulting lime slurry, producing a water solution of the calcium salt of 2-mercaptobenzothiazole. This solution is filtered from the excess lime and the insoluble tar or "heel". If desired, instead of filtering, the insoluble matter may be allowed to settle and the supernatant liquid may then be decanted. The resulting clear solution of the calcium salt is then gassed. Chlorine is introduced into the solution through suitable distributor heads and with good agitation. Temperatures of about 10–35° C. give good results although higher and lower temperatures may also be used. About 20° C. works very well. The rate of gassing is preferably such that the reaction will take up substantially all the chlorine as it is added. The appearance of free chlorine above the slurry of the precipitated disulphide will then show when the end point is reached. If preferred, litmus paper may be used in determining the end point, the reaction being continued until the litmus just turns pink. After the end point has been reached, the introduction of chlorine is stopped. The solution is then heated or blown with air to remove any excess chlorine. This removes excess chlorine and minimizes corrosion difficulties. If the solution is heated to approximately the boiling temperature, the physical and chemical properties of the product are improved. The dibenzothiazyl disulphide, which is precipitated on oxidation by the chlorine gas, is then filtered off. It has a very high purity and may be marketed without further purification. Starting with 2-mercaptobenzothiazole produced by the Kelly process and containing about 8.0% of impurities, the disulphide may be obtained with a purity of 98.0%. Other diarylenethiazyl disulphides may be prepared by using the corresponding mercaptoarylenethiazoles in place of the 2-mercaptobenzothiazole of the example.

One of the most widely used methods for preparing 2-mercaptoarylenethiazoles is the previously mentioned Kelly process, described in U. S. Patent 1,631,871. The process of the present invention is particularly useful in connection with 2-mercaptoarylenethiazoles so prepared. Analogous products containing similar impurities are obtained from other processes such as those described in U. S. Patent No. 1,891,198 which employs dianilinomethane, sulphur and carbon bisulphide; U. S. Patent No. 2,070,522 which employs formanilide and sulphur, with or without carbon bisulphide; U. S. Patent No. 1,906,112 which employs thiocarbanilide, carbon bisulphide and sulphur dichloride; U. S. Patent No. 1,858,344 which employs anilinobenzothiazole and sulphur; U. S. Patent No. 1,753,878 which employs phenyl mustard oil and sulphur; U. S. Patent No. 1,712,968 which employs diphenylthiourea, carbon bisulphide and sulphur; U. S. Patent No. 1,972,963 which employs anhydroformaldehyde-aniline and sulphur; U. S. Patent No. 1,865,477 which employs o,o'-diaminodiphenyldisulphide and carbon bisulphide; U. S. Patent No. 2,123,841 which employs aniline sulphite, aniline and carbon bisulphide; and U. S. Patent No. 2,001,587 which employs aniline, nitrobenzene and carbon bisulphide. The reactants specified in each of these examples produce 2-mercaptobenzothiazole; other 2-mercaptoarylenethiazoles may be prepared by selection of appropriate analogous starting materials. All of these methods are related in that the conditions of reaction are quite similar. Each is carried out at a temperature of about 150–300° C. and thus produces the 2-mercaptoarylenethiazole in molten form. In practice, the molten product may be discharged directly into the slurry of lime, preferably with stirring. Alternatively, the molten product may be cooled, broken up into lumps and mixed with the lime. Also, the crude product may first be converted into pellets by pouring the molten material into water, with stirring and preferably with the water at a temperature of about 50–90° C., or, if desired, the product may first be treated with dilute acid according to the process set forth in U. S. Patent No. 2,117,120. Discharging the molten product into water or, preferably, dilute acid effects some purification and gives a final product of improved purity when used in conjunction with the present invention.

If desired, other alkaline earth metal salts of 2-mercaptoarylenethiazoles may be used in place of the calcium salts and bromine may be used in place of chlorine, but chlorine and the calcium salts are effective and economical and are preferred materials.

I claim:

1. A method of producing dibenzothiazyl disulphide from a crude mercaptobenzothiazole, containing tarry matter which is less soluble in lime water than in caustic soda solution which comprises converting the 2-mercaptobenzothiazole to its calcium salt and dissolving the same in water, separating insoluble matter including the tarry matter therefrom, and then oxidizing to benzothiazyl disulphide by a halogen gas.

2. The method of producing dibenzothiazyl disulphide which comprises treating a crude 2-mercaptobenzothiazole which contains tarry matter with lime and water to produce the calcium salt of 2-mercaptobenzothiazole, separating the water solution of this calcium salt from insoluble residue and then chlorinating to oxidize the 2-mercaptobenzothiazole salt to benzothiazyl disulphide.

ROBERT W. MOORHOUSE.